US012749955B2

(12) United States Patent
Yonemori

(10) Patent No.: US 12,749,955 B2
(45) Date of Patent: Sep. 29, 2026

(54) VEHICLE DRIVE SYSTEM

(71) Applicant: Mazda Motor Corporation, Hiroshima (JP)

(72) Inventor: Kei Yonemori, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 197 days.

(21) Appl. No.: 18/661,183

(22) Filed: May 10, 2024

(65) Prior Publication Data

US 2024/0388188 A1 Nov. 21, 2024

(30) Foreign Application Priority Data

May 15, 2023 (JP) ................................ 2023-080425

(51) Int. Cl.
*H02K 21/46* (2006.01)
*H02K 1/276* (2022.01)

(52) U.S. Cl.
CPC ............ *H02K 21/46* (2013.01); *H02K 1/276* (2013.01)

(58) Field of Classification Search
CPC ... H02K 17/14; B60L 15/20; B60L 2240/642; B60L 2250/28; B60L 2220/12
See application file for complete search history.

(56) References Cited

U.S. PATENT DOCUMENTS 5,682,073 A * 10/1997 Mizuno ................ H02K 21/046 310/156.25
6,008,616 A * 12/1999 Nagayama ............ B60L 15/025 318/773
2003/0098627 A1* 5/2003 Mitchell ................ H02K 7/003 310/156.08

FOREIGN PATENT DOCUMENTS

JP 2000-178840 A 6/2000

* cited by examiner

*Primary Examiner* — Tulsidas C Patel
*Assistant Examiner* — Mohammed Ahmed Qureshi
(74) *Attorney, Agent, or Firm* — XSENSUS LLP

(57) ABSTRACT

The vehicle drive system includes a motor that has a stator and a rotor and drives a drive wheel. The stator has primary conductors that are aligned in a circumferential direction. The rotor has: secondary conductors that are aligned in the circumferential direction in a radially outer portion; and permanent magnets that are aligned in the circumferential direction in a radially inner portion. An ECU is provided to generate a rotating magnetic field in the stator through a current supply to the primary conductor and to set a drive mode of the motor to an asynchronous operation mode in which the rotor is rotated by using an induced current generated in the secondary conductor. In the asynchronous operation mode, the ECU is configured to cause the motor to generate pulsation by making a number of poles of the stator different from a number of poles of the permanent magnet.

5 Claims, 12 Drawing Sheets

VEHICLE DRIVE SYSTEM

CROSS-REFERENCE TO RELATED APPLICATION

The present application claims priority to Japanese Patent Application 2023-080425, filed May 15, 2023, the entire contents of which are incorporated herein by reference.

BACKGROUND

Field

The present disclosure relates to a vehicle drive system and, in particular, to a vehicle drive system that is applied to a vehicle traveling by using a motor as a drive source.

Description of the Related Art

Conventionally, an electric vehicle has been known to travel without an internal combustion engine (an engine) but with an electric motor (a motor), which generates less vibration than the engine, as a drive source.

An IM motor (an asynchronous motor) including a stator and a cage-shaped rotor and a PM motor (a synchronous motor) including a stator and a rotor embedded with a permanent magnet are general examples of such a motor. For example, the following motor is disclosed in Patent document 1. The motor includes a stator and a cage-shaped rotor, and a permanent magnet is embedded in the cage-shaped rotor.

PRIOR ART DOCUMENTS

Patent Documents

[Patent document 1] JP2000-178840A

SUMMARY

By the way, it has been known that engine vibration produced by combustion or the like is transmitted to a cabin of a vehicle having the engine. Since such engine vibration is changed by a difference in an engine operation state, such as idle operation or depression of an accelerator pedal, many users (drivers) recognize the engine operation state from such vibration transmitted to the cabin.

On the contrary, in the electric vehicle that uses the motor as the drive source, the motor is not rotated (vibrated) during a stop of the vehicle, and the motor vibration during travel is less than the engine vibration. Thus, it is difficult for the driver to recognize the motor vibration. Thus, when the driver who is accustomed to driving the engine vehicle drives the electric vehicle, the driver may feel a sense of discomfort due to a reason that the driver cannot recognize the operation state from the vibration transmitted to the cabin. In this regard, the motor vibration is not described at all in Patent document 1.

The disclosure has been made in view of such a point and therefore has a purpose of providing a vehicle drive system capable of allowing a driver to recognize an operation state from vibration of a motor in a vehicle that uses the motor as a traveling drive source.

Means for Solving the Problem

In order to achieve the above purpose, a vehicle drive system according to the disclosure creates such a state where pulsation can be generated easily when the motor is rotationally driven.

More specifically, the disclosure provides a vehicle drive system including a motor that has a cylindrical stator and a cylindrical rotor rotatably provided in the stator to be coaxial with a center axis of the stator and that drives a drive wheel of the vehicle by rotation of the rotor.

The stator has plural primary conductors that extend in an axial direction and are aligned in a circumferential direction. The rotor has: plural secondary conductors that extend in the axial direction and are aligned in the circumferential direction in a radially outer portion; and plural permanent magnets that extend in the axial direction and are aligned in the circumferential direction in a portion on a radially inner side of these plural secondary conductors. This vehicle drive system further includes a control section capable of generating a rotating magnetic field in the stator through a current supply to the primary conductor and setting a drive mode of the motor to an asynchronous operation mode in which the rotor is rotated by using an induced current generated in the secondary conductor. The control section is configured to cause the motor to generate pulsation by making the number of poles of the stator different from the number of poles of the permanent magnet in the asynchronous operation mode.

With this configuration, in the asynchronous operation mode, the control section causes the generation of the pulsation by making the number of the poles of the stator different from the number of the poles of the permanent magnets. Thus, a driver can recognize an operation state from vibration of the motor transmitted to a cabin.

In the vehicle drive system, the control section may be configured to change the number of the poles of the stator by changing a direction of a current flowing through each of the plural primary conductors and increasing/reducing a number of primary conductor groups, in each of which the current flows in the same direction and the primary conductors are continuously aligned in the circumferential direction, on the basis of a driving operation by a driver such that the pulsation of the motor is changed according to the driving operation.

With this configuration, for example, the number of the poles of the stator (the motor) is changed on the basis of the driving operation by the driver, such as an accelerator operation. Accordingly, the pulsation of the motor is changed before and after the driving operation. As a result, the driver can recognize acceleration desired by the driver himself/herself with the vibration of the motor transmitted to the cabin, for example.

Furthermore, in the vehicle drive system, the control section may be configured to change the number of the poles of the stator by changing a direction of a current flowing through each of the plural primary conductors and increasing/reducing a number of primary conductor groups, in each of which the current flows in the same direction and the primary conductors are continuously aligned in the circumferential direction, on the basis of surrounding travel environment of an own vehicle such that the pulsation of the motor is changed according to the surrounding travel environment.

With this configuration, the number of the poles of the stator (the motor) is changed on the basis of the surrounding travel environment of the own vehicle such as an uphill road, turning, or traveling on a winding road. Accordingly, the pulsation of the motor is changed before and after a change in the surrounding travel environment. As a result, with the vibration of the motor transmitted to the cabin, the driver can recognize the increased motor torque due to the uphill road, or the like, for example.

Advantages

As it has been described so far, the vehicle drive system according to the disclosure allows the driver to recognize the operation state from the motor vibration in the vehicle that uses the motor as a traveling drive source.

BRIEF DESCRIPTION OF THE DRAWINGS

The scope of the present disclosure is best understood from the following detailed description of exemplary embodiments when read in conjunction with the accompanying drawings.

FIGS. 10A and 10B include views, each of which schematically illustrate a principle of rotation of the motor in an asynchronous operation mode, and in which FIG. 10A illustrates the eight-pole motor in a low-speed range, and FIG. 10B illustrates a four-pole motor in a high-speed range.

DETAILED DESCRIPTION

A description will hereinafter be made on a mode for carrying out the disclosure with reference to the drawings.

(Overall Configuration of Electric Vehicle)

Figure 1:
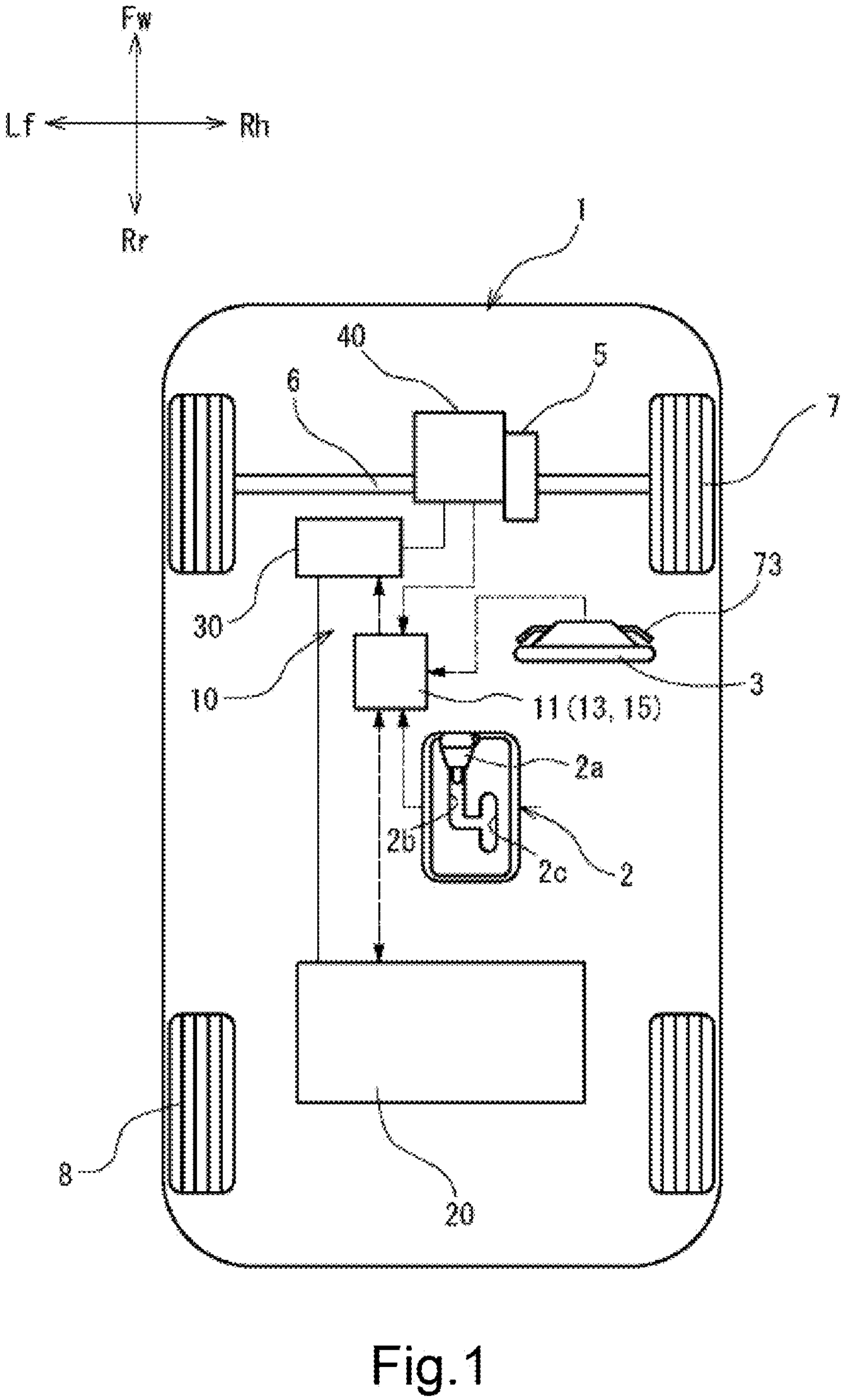
FIG. 1 is a plan view schematically illustrating a vehicle on which a vehicle drive system according to an embodiment of the disclosure is mounted.

FIG. 1 is a plan view schematically illustrating a vehicle 1 on which a vehicle drive system 10 according to this embodiment is mounted. FIG. 1 indicates a front side Fw in a vehicle front-rear direction, a rear side Rr in the vehicle front-rear direction, a right side Rh in a vehicle width direction, and a left side Lf in the vehicle width direction. As illustrated in FIG. 1, the vehicle 1 includes a battery 20, an inverter 30, a motor 40, and various electronic control units (ECUs) 11, 13, 15 for controlling these components. These battery 20, inverter 30, motor 40, and various ECUs 11, 13, 15 constitute essential parts of the vehicle drive system 10.

In this vehicle 1, the inverter 30 converts a direct current supplied from the battery 20 to an alternating current and supplies the alternating current to the motor 40, and the motor 40 is thereby rotationally driven. Torque generated by the motor 40, which is rotationally driven just as described, is reduced by a reduction drive 5 and then output to a driveshaft 6. Consequently, a right and left pair of drive wheels (front wheels 7) is rotationally driven to cause rotation of driven wheels (rear wheels 8). In this way, the vehicle 1 travels. That is, the vehicle 1 is configured as an electric vehicle that travels by using the motor 40 as a drive source. Thus, hereinafter, the vehicle 1 will also be referred to as an "electric vehicle 1".

As illustrated in FIG. 1, the electric vehicle 1 also includes a shifter 2 and a paddle switch 73 that is provided on a steering wheel 3. A signal corresponding to an operation of each of these shifter 2 and paddle switch 73 is input to the ECU 11. This electric vehicle 1 is not equipped with a transmission, which is usually mounted on an engine vehicle. However, when a driver operates any of these shifter 2 and paddle switch 73, a characteristic of the motor 40 is changed to enable "driving" that reflects the driver's preference.

(Vehicle Drive System)

Figure 2:
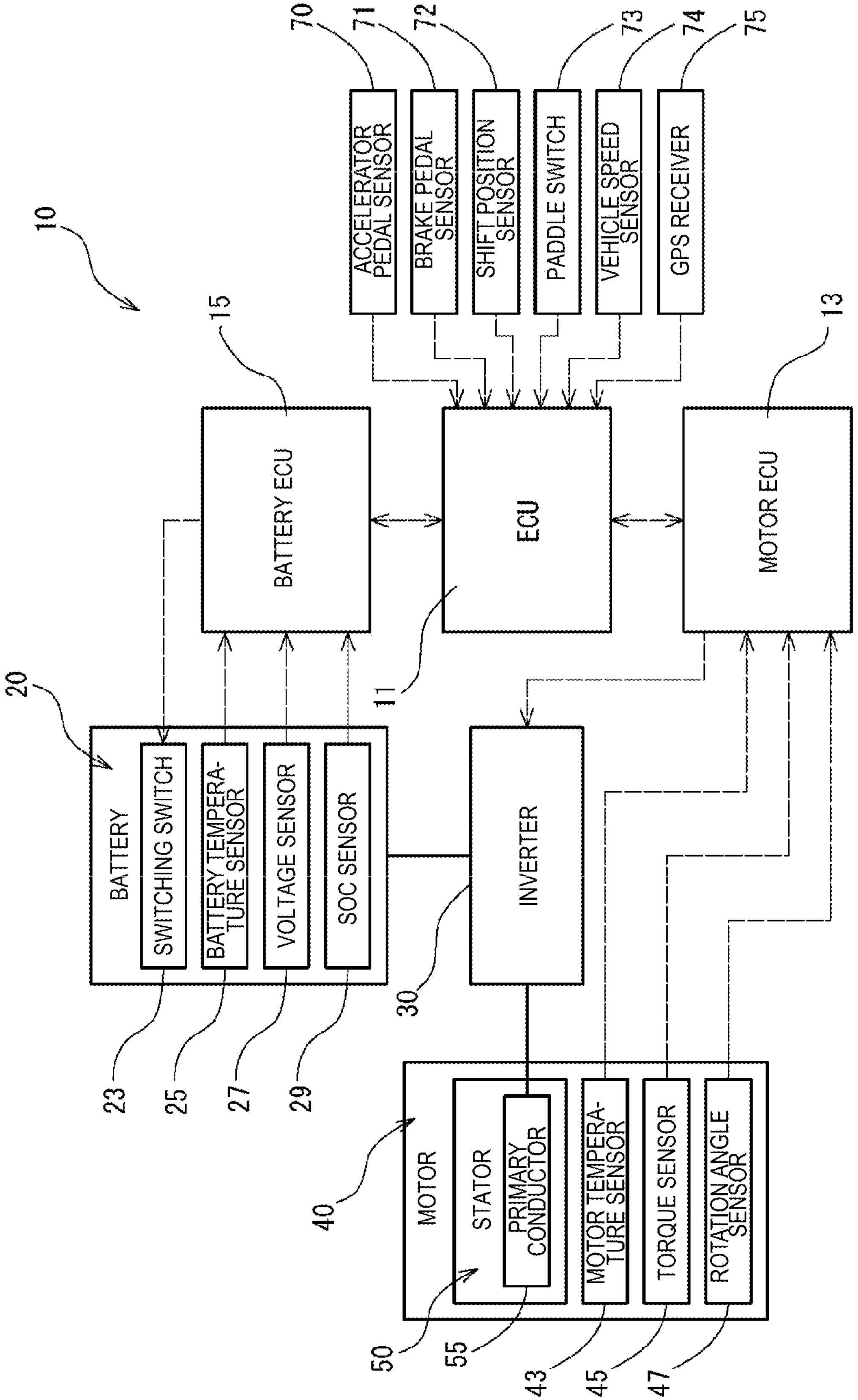
FIG. 2 is a block diagram schematically illustrating the vehicle drive system.

FIG. 2 is a diagram schematically illustrating the vehicle drive system 10. As illustrated in FIG. 2, this vehicle drive system 10 includes the ECU 11, the motor ECU 13, the battery ECU 15, the battery 20, the inverter 30, the motor 40, various sensors (including switches) 70, 71, 72, 73, 74, and a GPS (Global Positioning System) receiver 75. For example, the various sensors 70, 71, 72, 73, 74 detect an accelerator pedal depression amount, a brake pedal depression amount, a vehicle speed V of the electric vehicle 1, and the like.

—ECU—

The ECU 11 is configured to include a so-called microcomputer having, for example, a central processing unit (CPU), read only memory (ROM) that stores a program executed by the CPU, a map, and the like in advance, random access memory (RAM) in which the CPU temporarily stores data when necessary, backup RAM that holds the data even when power is cut off, an input/output interface, and the like. The CPU processes the signal according to the program that is stored in the ROM in advance while using the temporary storage function of the RAM, and thereby executes various types of control.

In addition, the ECU 11 is connected to the motor ECU 13 and the battery ECU 15 via a controller area network (CAN) communication line, can exchange information with each other as indicated by broken arrows in FIG. 2, and plays a role in integrating the motor ECU 13 and the battery ECU 15.

Furthermore, as illustrated in FIG. 2, the ECU 11 is electrically connected to an accelerator pedal sensor 70, a brake pedal sensor 71, a shift position sensor 72, the paddle switch 73, a vehicle speed sensor 74, and the GPS receiver 75, and detection results and various types of information are input/transmitted from these sensors to the ECU 11.

The accelerator pedal sensor 70 is attached to an accelerator pedal, detects the accelerator pedal depression amount, and outputs a signal representing the detected accelerator pedal depression amount to the ECU 11. The accelerator pedal sensor 70 may be configured to detect an accelerator pedal depression change amount (a change amount per unit time).

The brake pedal sensor 71 is attached to a brake pedal, detects the brake pedal depression amount, and outputs a signal representing the detected brake pedal depression amount to the ECU 11. The brake pedal sensor 71 may be configured to detect a brake pedal depression change amount (a change amount per unit time).

The shift position sensor 72 is provided to each shift position in the shifter 2, detects which of a parking (P) range, a reverse (R) range, a drive (D) range, and a manual (M)

range a shift lever 2*a* is located, and outputs a detection result to the ECU 11. The P range, the R range, and the D range are arranged in a main gate 2*b* while the M range is arranged in a sub gate 2*c*. Furthermore, the sub gate 2*c* is a returnable gate with the M range being a reference position. The shift position sensor 72 is configured to output, to the ECU 11, a signal in any of five levels D−−, D−, D, D+, D++ in response to the number of operations to move the shift lever 2*a* to the front in the vehicle front-rear direction (positive operations) or the number of operations to move the shift lever 2*a* to the rear in the vehicle front-rear direction (negative operations) performed by the driver.

The paddle switch 73 is a returnable switch that is provided as a right and left pair on a back side (the front side in the vehicle front-rear direction) of the steering wheel 3 and that can repeatedly be pulled toward the driver (rearward in the vehicle front-rear direction) by the driver. The right and left pair of the paddle switches 73 is configured to output, to the ECU 11, a signal in any of five levels D−−, D−, D, D+, D++ in response to the number of operations to pull the paddle switch 73 on the right side in the vehicle width direction toward the driver (positive operations) or the number of operations to pull the paddle switch 73 on the left side in the vehicle width direction toward the driver (negative operations).

The ROM of the ECU 11 stores required torque for the motor 40 that is set to be increased in an order of D−−, D−, D, D+, D++. Then, the ECU 11 controls the motor 40 in a manner to reflect the driver's intention that is expressed by the operation of the shift lever 2*a* or the paddle switch 73.

The vehicle speed sensor 74 is configured to detect the vehicle speed V of the electric vehicle 1 on the basis of wheel rotational speeds of the drive wheels (the front wheels 7) and the like and output a signal representing the detected vehicle speed V to the ECU 11. The ECU 11 is configured to control the motor 40 on the basis of the vehicle speed V detected by the vehicle speed sensor 74, and the like.

The GPS receiver 75 measures a location of the electric vehicle 1 (for example, latitude and longitude of the electric vehicle 1) by receiving radio waves from plural GPS satellites, and transmits the location information to the ECU 11. The ECU 11 is configured to acquire (recognize) surrounding travel environment of the electric vehicle 1 on the basis of the location information received from the GPS receiver 75, a map database stored in the ROM, for example, and the like. More specifically, the ECU 11 acquires information such as on whether the electric vehicle 1 is traveling on a flat road, traveling on an uphill road, traveling on a downhill road, turning, traveling on a winding road, or traveling in an urban area. Here, when the information such as on whether the electric vehicle 1 is traveling on the uphill road or the downhill road is to be acquired, the method for acquiring the surrounding travel environment is not limited thereto, and a gradient sensor that detects a road surface gradient may be used.

—Battery—

The battery 20 is configured as a battery pack in which plural electrically-connected battery modules 21 (see FIG. 3) are stacked and accommodated in a battery case. Each of the battery modules 21 includes, as a main portion, plural battery cells, each of which is a lithium-ion secondary battery, a nickel-metal hydride secondary battery, or the like. In detail, each of the battery modules 21 is a module that is formed by electrically connecting the plural battery cells. The battery cells and insulators are alternately stacked in a manner to hold the insulator between two each of the battery cells.

As illustrated in FIG. 2, a battery temperature sensor 25, a voltage sensor 27, a state of charge (SOC) sensor 29, and the like are attached to the battery 20. The battery temperature sensor 25 detects a temperature of the battery 20. The voltage sensor 27 detects a voltage of the battery 20. The SOC sensor detects an SOC of the battery 20. These battery temperature sensor 25, voltage sensor 27, and SOC sensor 29 are electrically connected to the battery ECU 15 and configured to output a signal representing the detected temperature, a signal representing the detected voltage, and a signal representing the SOC to the battery ECU 15, respectively.

—Battery ECU—

Similar to the ECU 11, the battery ECU 15 is configured to include a so-called microcomputer having, for example, a CPU, ROM, RAM, backup RAM, an input/output interface, and the like. The CPU processes the signal according to the program that is stored in the ROM in advance while using the temporary storage function of the RAM, and thereby executes various types of control.

As described above, the battery ECU 15 is connected to the ECU 11 via the CAN communication line, and is configured to output, to the ECU 11, the signal on the temperature of the battery 20 received from the battery temperature sensor 25, the signal on the voltage of the battery 20 received from the voltage sensor 27, and the signal on the SOC of the battery 20 received from the SOC sensor 29. In addition, when the temperature of the battery 20 is excessively low, regenerative charging capability is impaired. On the contrary, when the temperature of the battery 20 is excessively high, failure possibly occurs. Thus, the battery ECU 15 is configured to adjust a flow rate of a battery coolant, and the like on the basis of the temperature of the battery 20.

Figure 3A:
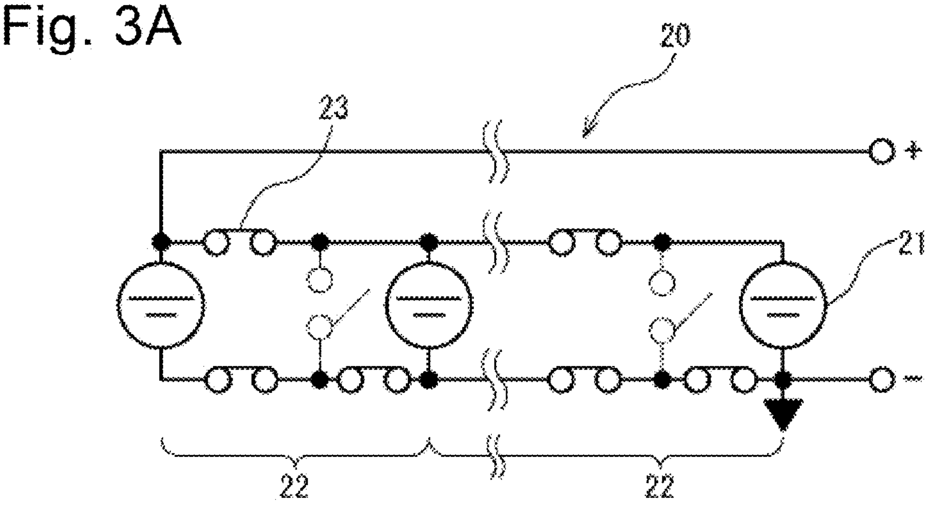
FIGS. 3A and 3B include views, each of which schematically illustrate a configuration of a battery.
Figure 3B:
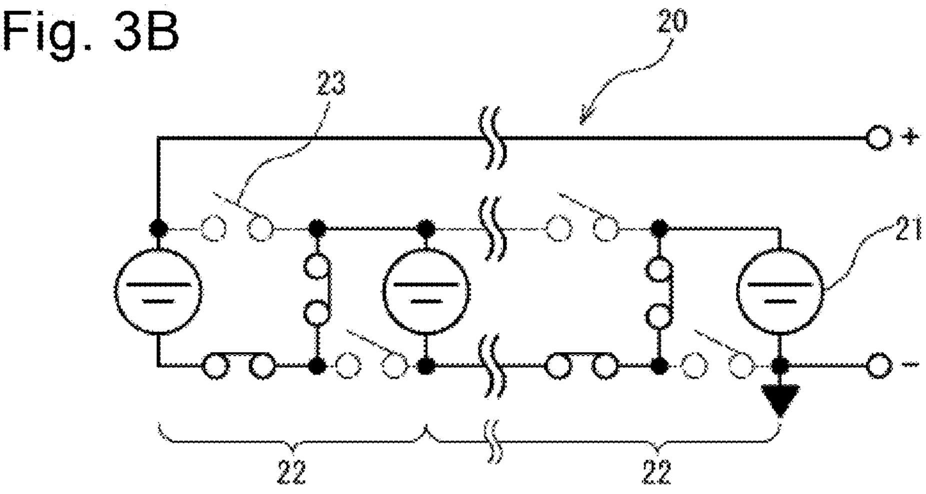

FIGS. 3A and 3B include views, each of which schematically illustrate the configuration of the battery 20. In FIGS. 3A and 3B, in order to make the drawing easily viewable, the battery modules 21 and switching switches 23 are deformed. As illustrated in FIGS. 3A and 3B, the plural battery modules 21 are configured to include plural ([number of the battery modules 21-1]) battery module pairs 22 that are electrically connected to each other via the switching switches 23. Each of the switching switches 23 is configured to be switched between ON/OFF on the basis of a command from the battery ECU 15.

With such a configuration, when the switching switch 23 is switched by the command from the battery ECU 15 as illustrated in FIG. 3A, all of the plural battery modules 21 (the battery module pairs 22) can be connected in parallel in the battery 20. Just as described, when all of the plural battery modules 21 are connected in parallel in the battery 20, a supply voltage is relatively reduced, but a supply current can relatively be increased.

Meanwhile, when the switching switch 23 is switched by the command from the battery ECU 15 as illustrated in FIG. 3B, all of the plural battery modules 21 (the battery module pairs 22) can be connected in series in the battery 20. Just as described, when all of the plural battery modules 21 are connected in series in the battery 20, the supply current is relatively reduced, but the supply voltage can relatively be increased.

When the switching switch 23 is switched by the command from the battery ECU 15, a connection mode of some of the battery module pairs 22 can be set in series, and the connection mode of the rest of the battery module pairs 22 can be set in parallel.

The battery ECU 15 and the battery 20 can change the connection mode of the battery module pairs 22 between in series and in parallel not only when the electric vehicle 1 is stopped or parked but also when the electric vehicle 1 is traveling.

—Motor and Inverter—

<Overall Configuration>

Figure 4:
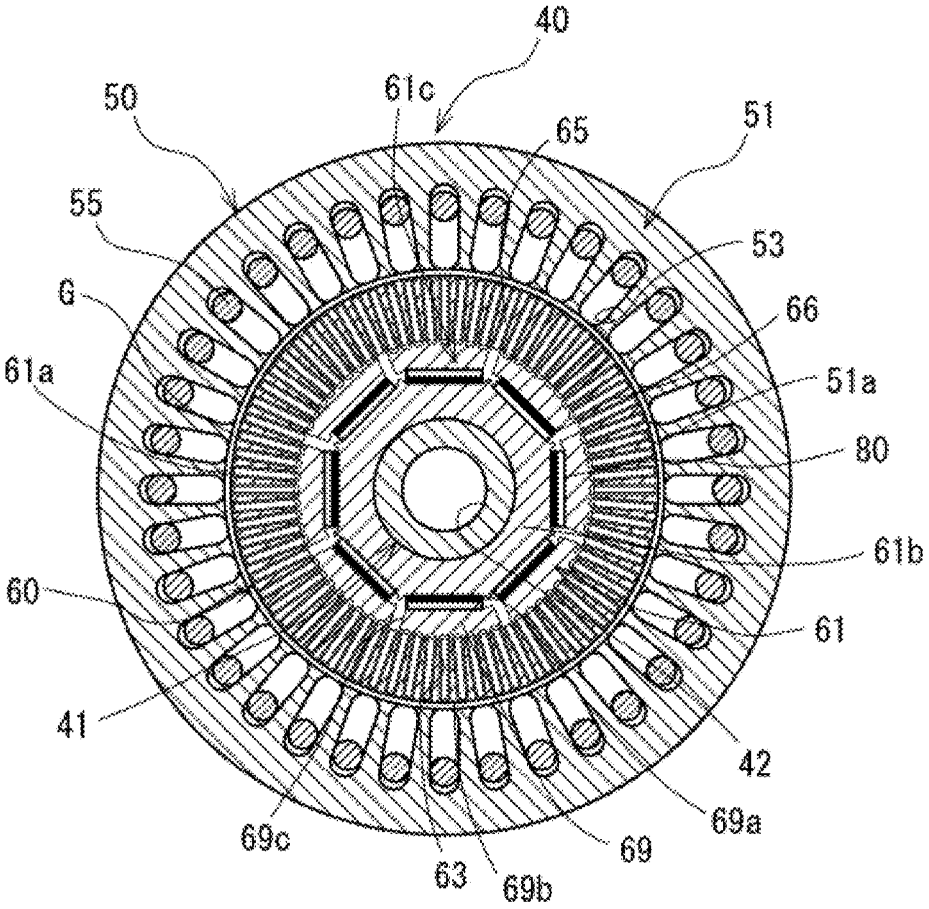
FIG. 4 is a cross-sectional view schematically illustrating a motor.

FIG. 4 is a cross-sectional view schematically illustrating the motor 40. In FIG. 4, in order to make the drawing easily viewable, a secondary conductor 65 and a resin 66 are not hatched. In addition, in FIG. 4, in order to make the drawing easily viewable, an air gap G is exaggerated in size. As illustrated in FIG. 4, the motor 40 includes a rotary shaft 41, a rotor 60, and a stator 50. The motor 40 is mounted on the electric vehicle 1 in a manner to set the rotary shaft 41 to be substantially horizontal.

The rotary shaft 41 is supported by a casing of the motor 40 to be rotatable by a bearing. The rotary shaft 41 is formed in a cylindrical shape, and an internal space thereof constitutes a channel 42 through which a refrigerant for cooling each section of the motor 40 flows. A pump is connected to one end of the channel 42, and the refrigerant is supplied by this pump.

The rotor 60 is formed in a cylindrical shape whose inner diameter is slightly larger than an outer diameter of the rotary shaft 41. The rotor 60 is arranged on a radially outer side of the rotary shaft 41 and is attached to the rotary shaft 41 in an integrally rotatable manner therewith. Meanwhile, the stator 50 is formed in a cylindrical shape, and is arranged on a radially outer side of the rotor 60 such that a center axis of the stator 50 matches a center axis of the rotary shaft 41. In other words, the rotor 60 is rotatably arranged in the stator 50 to be coaxial with the center axis of the stator 50. An inner diameter of the stator 50 and an outer diameter of the rotor 60 are set to such dimensions that, when the rotor 60 is arranged in the stator 50, an inner circumferential surface 51*a* of the stator 50 and an outer circumferential surface 61*a* of the rotor 60 oppose each other across the air gap G.

In addition, as illustrated in FIG. 2, a motor temperature sensor 43, a torque sensor 45, a rotation angle sensor 47, and the like are attached to the motor 40. The motor temperature sensor 43 detects a temperature of the motor 40, the torque sensor 45 detects motor torque, and the rotation angle sensor 47 detects a rotation angle of the rotor 60. These motor temperature sensor 43, torque sensor 45, and rotation angle sensor 47 are electrically connected to the motor ECU 13 and output, to the motor ECU 13, a signal representing the detected temperature, a signal representing a magnitude of the motor torque, and a signal representing the rotation angle of the rotor 60, respectively.

In the thus-configured motor 40, a drive current is supplied to the stator 50 from the battery 20 via the inverter 30 on the basis of a command from the motor ECU 13. Consequently, a rotating magnetic field is created in the stator 50, which in turn rotationally drives the rotor 60 and drives the front wheels 7 of the electric vehicle 1. Hereinafter, the rotor 60, the stator 50, and the inverter 30 will be described in detail.

<Rotor>

As illustrated in FIG. 4, the rotor 60 has a rotor core 61, the plural secondary conductors 65 that are embedded in the rotor core 61, and plural (eight) permanent magnets 80 that are also embedded in the rotor core 61.

The rotor core 61 is made of a magnetic material such as iron and has an inner prism section 61*b* and an outer cylindrical section 61*c*. The inner prism section 61*b* is formed in a prism shape whose outer shape is octagonal and inner shape is circular when seen in an axial direction.

The outer cylindrical section 61*c* has eight blocks 69. Each of the blocks 69 is formed to have such a cross-sectional shape that a lower base 69*b* of an isosceles trapezoid is arcuate when seen in the axial direction. In addition, the arcuate lower base 69*b* of each of the blocks 69 is formed with eight groove strips 63, each of which extends toward an upper base 69*a*. In the outer cylindrical section 61*c*, the eight blocks 69 are combined such that the upper base 69*a* of each of the blocks 69 faces a radially inner side and that legs 69 oppose each other in a circumferential direction. In this way, when seen in the axial direction, the outer cylindrical section 61*c* has a cylindrical shape whose outer shape is circular and inner shape is octagonal. In addition, when the eight blocks 69 are combined, a space between two each of the circumferentially-opposing legs 69*c* also constitutes the groove strip 63. In this way, in an outer circumferential section of the rotor core 61, the 72 (8 blocks×8 strips+8 strips) groove strips 63 are formed at equally-spaced intervals in the circumferential direction. Each of the groove strips 63 has a rectangular cross section, extends over an entire axial length of the rotor core 61, and is recessed radially inward from the outer circumferential surface 61*a* of the rotor core 61. In other words, in the outer circumferential section of the rotor core 61, the 72 groove strips 63, each of which extends in the radial direction, are radiated when seen in the axial direction. A rotor shatter-proof cover is attached to the outer circumferential surface 61*a* of the rotor core 61, in which the eight blocks 69 are combined.

The permanent magnet 80 is formed in a plate shape that extends in the axial direction of the rotor 60 and has a rectangular cross section. Each of the eight permanent magnets 80 is embedded in the rotor core 61 in a manner to be sandwiched between an outer circumferential surface of the inner prism section 61*b* having the octagonal outer shape and the upper base 69*a* of respective one of the eight blocks 69. As illustrated in FIG. 4, these eight permanent magnets 80 are arranged such that the permanent magnet 80, whose N pole indicated in black faces radially outward and S pole indicated in blank faces radially inward, and the permanent magnet 80, whose S pole faces radially outward and N pole faces radially inward, are alternately aligned in the circumferential direction. In this way, the permanent magnets 80 form eight poles. In addition, these eight permanent magnets 80 are integrated with the rotor core 61 by the resin 66 that is supplied through the groove strips 63, each of which is formed by the circumferentially-opposing legs 69.

Each of the permanent magnets 80 is made of a ferrite magnet. A motor that uses a rare earth magnet, such as neodymium, as the permanent magnet has such concern that, when the permanent magnet reaches a high temperature (220°), the permanent magnet is permanently demagnetized by an antimagnetic field and loses a function as the magnet, which causes the motor to no longer function. However, in this embodiment, since the ferrite magnet is used as the permanent magnet 80, it is possible to suppress a reduction in motor output, which is caused by demagnetization of the permanent magnet 80 in a high-speed, high-load state.

Figure 5:
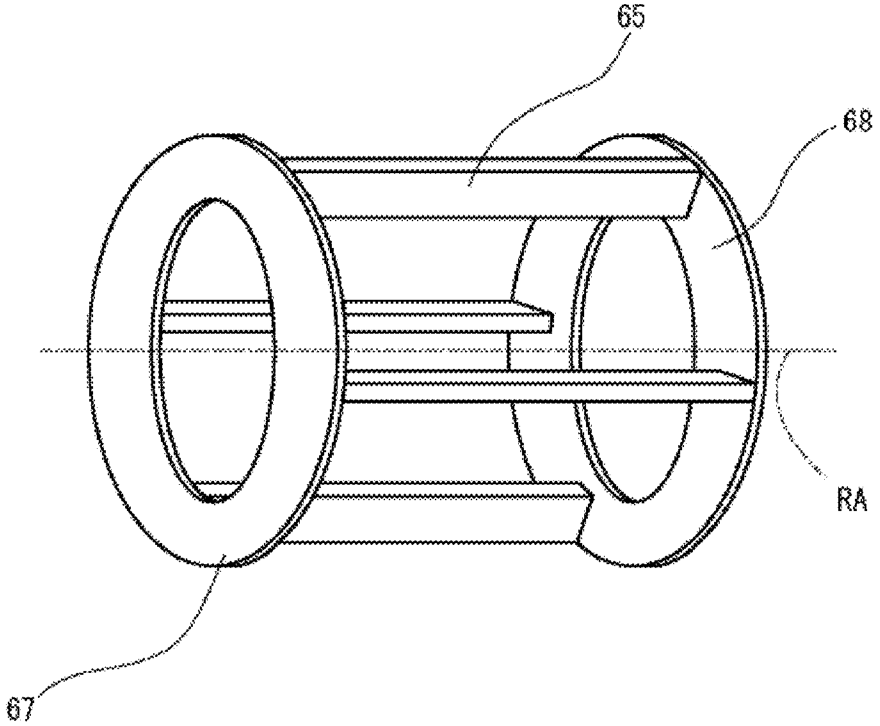
FIG. 5 is a perspective view schematically illustrating a secondary conductor.

FIG. 5 is a perspective view schematically illustrating the secondary conductor 65. In FIG. 5, in order to make the drawing easily viewable, only 4 of the 72 secondary conductors 65 are illustrated. In addition, FIG. 5 illustrates a rotation axis RA of the motor 40. Each of the secondary conductors 65 is made of a magnetic material such as copper and, as illustrated in FIG. 4 and FIG. 5, formed in a rectangular plate shape that extends over an entire axial length of the rotor 60. Each of the 72 secondary conductors 65 is inserted in respective one of the groove strips 63 that are formed in the outer circumferential section of the rotor core 61. In this way, the 72 secondary conductors 65 are aligned in the circumferential direction and radiated when seen in the axial direction. A gap between each of the groove strips 63 and each of the secondary conductors 65 inserted in the respective groove strip 63 is filled with the resin 66 that is supplied by injection molding. In this way, the rotor core 61 and the secondary conductors 65 are integrated. Here, FIG. 4 illustrates the 72 groove strips 63 and the 72 secondary conductors 65. However, these are merely illustrative, and the number of the groove strips 63 and the number of the secondary conductors 65 are not limited thereto.

As illustrated in FIG. 5, in each of the 72 secondary conductors 65, an end portion on one side (a left side in FIG. 5) in the axial direction (of the rotation axis RA) is coupled to a copper-made first end ring 67 (a shortening ring) by welding or the like, and an end portion on the other side (a right side in FIG. 5) in the axial direction is coupled to a second end ring 68 (a shortening ring) by welding or the like. In this way, the 72 secondary conductors 65 define a cage shape. The 72 secondary conductors 65 are electrically connected to each other via the first and second end rings 67, 68, just as described, and thereby form a closed circuit. When each of the secondary conductors 65 crosses the magnetic field, an induced electromotive force is generated in the respective secondary conductor 65 due to electromagnetic induction. However, since the 72 secondary conductors 65 form the closed circuit as described above, an induced current flows through each of the secondary conductors 65. Here, in order to prevent current leakage, which possibly occurs when the induced currents flow in opposite directions through the circumferentially-adjacent secondary conductors 65, as much as possible, an outer circumferential surface of each of the secondary conductors 65 is covered with an insulator.

<Stator>

As illustrated in FIG. 4, the stator 50 has a cylindrical stator core 51 and plural primary conductors 55, each of which is provided in the stator core 51 in a manner to penetrate the stator 50 in the axial direction.

The stator core 51 may be formed by stacking and integrally coupling plural electromagnetic steel sheets, each of which is punched into a predetermined shape, for example, or may be formed of a powder magnetic body that is formed by subjecting magnetic powder to compression molding in a mold, for example. The stator core 51 has plural grooves referred to as slots 53. Each of the slots 53 extends radially outward from the inner circumferential surface 51*a* of the stator core 51, and the adjacent slots 53 separate from each other in a circumferential direction of the stator core 51.

Figure 6:
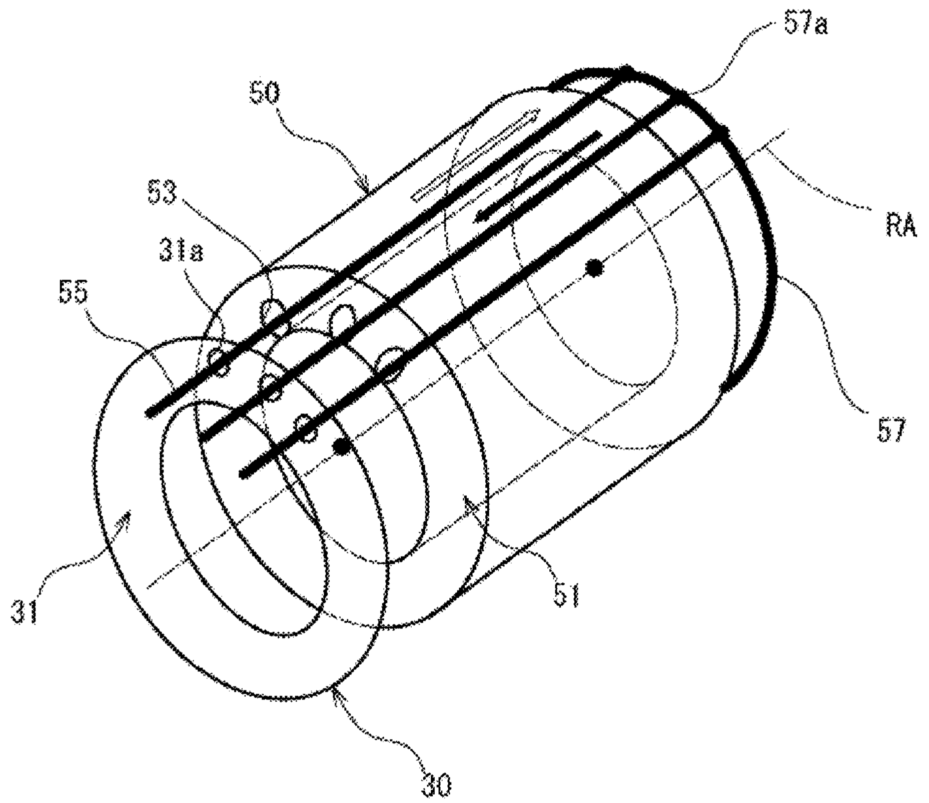
FIG. 6 is a perspective view schematically illustrating a primary conductor and an inverter.

FIG. 6 is a perspective view schematically illustrating the primary conductor 55 and the inverter 30. In FIG. 6, in order to make the drawing easily viewable, only 3 of the 36 primary conductors 55 are illustrated. Each of the primary conductors 55 is made of the magnetic material such as copper and, as illustrated in FIG. 4 and FIG. 6, formed in a round rod shape that extends over the entire axial length of the rotor 60. Since each of the primary conductors 55 is inserted in the respective slot 53, the 36 primary conductors 55 are aligned circumferentially and intermittently in a circular pattern when seen in the axial direction. Here, FIG. 4 illustrates the 36 slots 53 and the 36 primary conductors 55. However, this illustration is merely one example, and the number of the slots 53 and the number of the primary conductors 55 are not limited thereto.

As illustrated in FIG. 6, in the 36 primary conductors 55, each of which is inserted in the respective slot 53, each of end portions thereof on the other side (a right side in FIG. 6) in the axial direction (of the rotation axis RA) is connected to a copper-made bus ring 57 by welding or the like, and each connection sections 57*a* constitutes a neutral point with a potential of 0 (V). Meanwhile, each of end portions on the one axial side (a left side in FIG. 6) of the primary conductors 55 penetrates a respective hole 31*a* and is projected to the one axial side from a board 31. The holes 31*a* are formed on the ring-shaped board 31 of the inverter 30 and are aligned circumferentially and intermittently in a circular pattern.

<Inverter>

Figure 7:
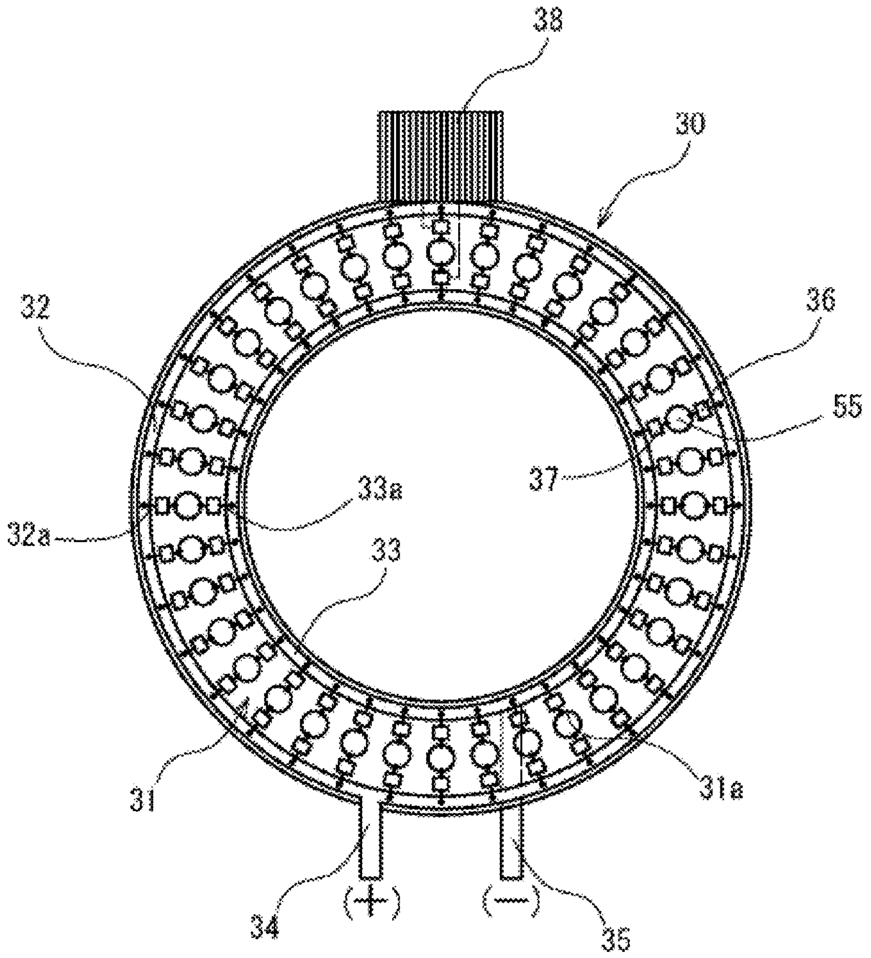
FIG. 7 is a front view schematically illustrating the inverter.

FIG. 7 is a front view schematically illustrating the inverter 30. As illustrated in FIG. 7, the inverter 30 includes, in addition to the board 31, an outer ring section 32, an inner ring section 33, a (+) terminal 34, a (−) terminal 35, an outer arm element 36, an inner arm element 37, and a signal line terminal 38. The inverter 30 is integrated with the motor 40 as illustrated in FIG. 6.

The outer ring section 32 is a ring-shaped member that is made of copper, and is attached to a radially outer portion of a surface on the one axial side of the ring-shaped board 31 in a coaxial manner with the board 31. This outer ring section 32 is integrally formed with the (+) terminal 34 that extends downward, and this (+) terminal 34 is connected to a positive terminal of the battery 20. In this way, the direct current is supplied to the outer ring section 32. This outer ring section 32 is electrically connected to each of the end portions of the 36 primary conductors 55, which are projected to the one axial side from the board 31, via an outer arm 32*a* that is made of copper and extends radially inward.

The inner ring section 33 is a ring-shaped member that is made of copper and formed to have a smaller diameter than the outer ring section 32, and is attached to a radially inner portion of the surface on the one axial side of the ring-shaped board 31 in the coaxial manner with the board 31. This inner ring section 33 is integrally formed with the (−) terminal 35, and this (−) terminal 35 is connected to a negative terminal of the battery 20. The (−) terminal 35 is connected to the inner ring section 33 on the surface on the one axial side of the board 31, penetrates the board 31 to a back side, and extends downward from a surface on the other axial side thereof. In addition, this inner ring section 33 is electrically connected to each of the end portions of the 36 primary conductors 55 via an inner arm 33*a* that is made of copper and extends radially outward.

As illustrated in FIG. 7, the outer arm element 36 is provided at an intermediate position of the outer arm 32*a*, and the inner arm element 37 is provided at an intermediate position of the inner arm 33*a*. Each of the outer arm element 36 and the inner arm element 37 is configured as a metal-oxide-semiconductor field-effect transistor (Si-MOSFET), for example, and enables high-speed switching. As indicated by broken lines in FIG. 7, the 36 outer arm elements 36 and the 36 inner arm elements 37 are each electrically connected to the signal line terminal 38, and switch ON/OFF of these outer arm elements 36 and inner arm elements 37 are separately controlled by the signal line terminal 38. The switch ON/OFF control by the signal line terminal 38 is executed on the basis of a command from the motor ECU 13.

When the outer arm element 36 is switched ON, the current flows from the outer ring section 32 to the primary conductor 55. Meanwhile, when the outer arm element 36 is switched OFF, the outer ring section 32 and the primary conductor 55 are insulated to prevent the current flow from the outer ring section 32 to the primary conductor 55. Similarly, when the inner arm element 37 is switched ON, the current flows from the primary conductor 55 to the inner ring section 33. Meanwhile, when the inner arm element 37 is switched OFF, the primary conductor 55 and the inner ring section 33 are insulated to prevent the current flow from the primary conductor 55 to the inner ring section 33.

Figure 8:
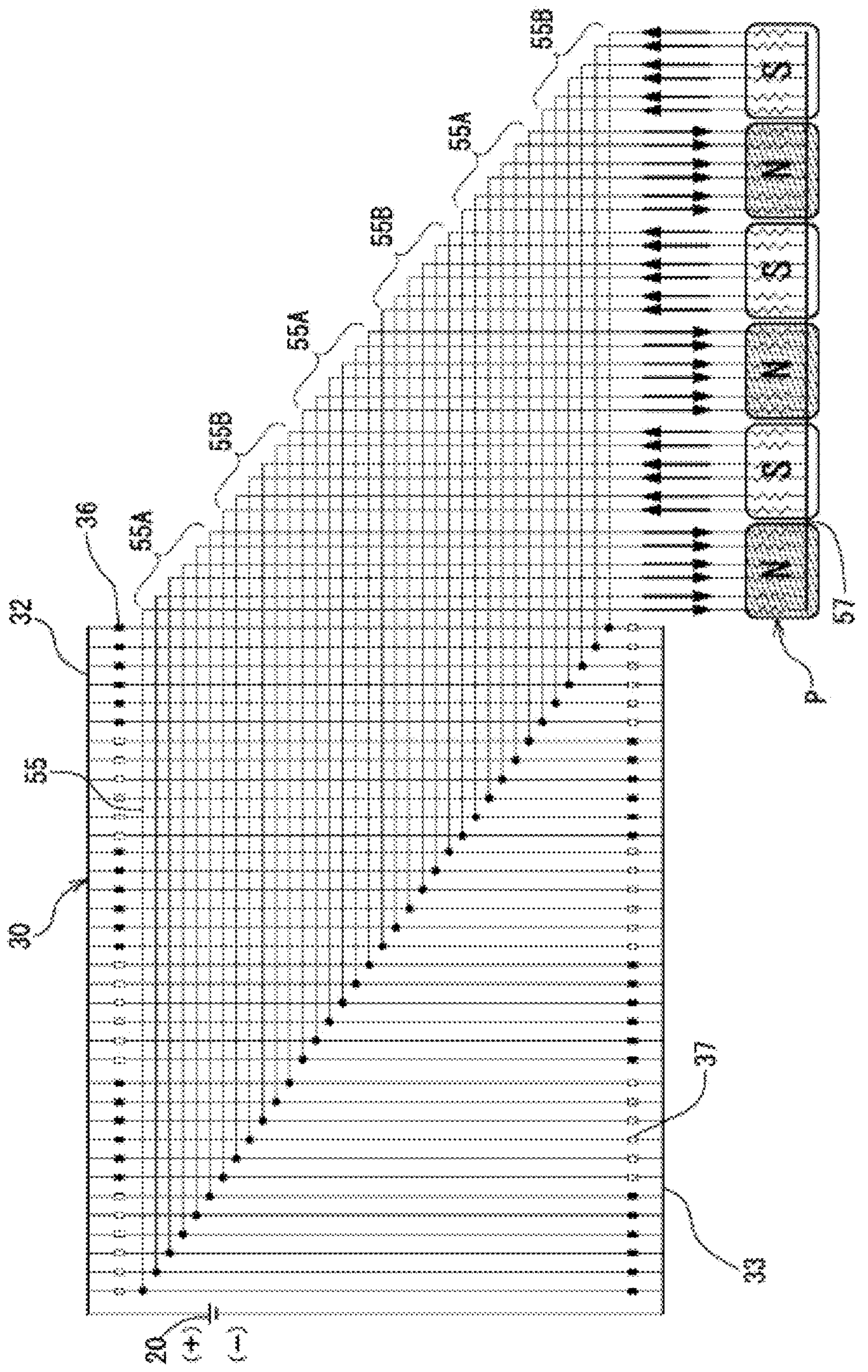
FIG. 8 is a conceptual view schematically illustrating a six-pole stator.
Figure 9:
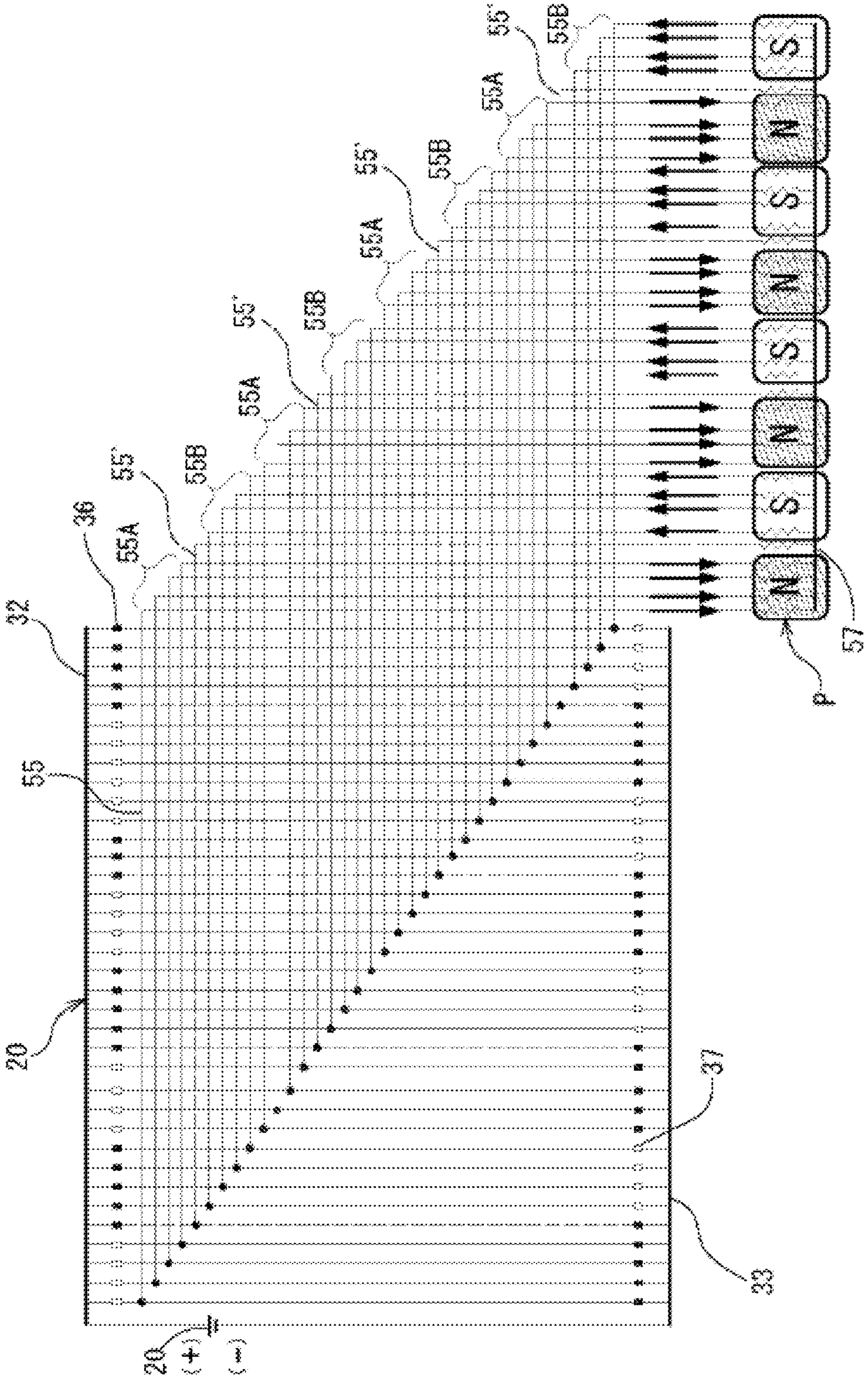
FIG. 9 is a conceptual view schematically illustrating an eight-pole stator.

FIG. 8 is a conceptual view schematically illustrating the six-pole stator 50, and FIG. 9 is a conceptual view schematically illustrating the eight-pole stator 50. In FIG. 8 and FIG. 9, in order to make the drawing easily viewable, the outer ring section 32, the inner ring section 33, and the bus ring 57, each of which has the ring shape, are deformed into straight lines. In addition, in FIG. 8 and FIG. 9, each of the outer arm element 36 and the inner arm element 37 indicated in a blank form represents a switch ON state, and each of the outer arm element 36 and the inner arm element 37 indicated in black represents a switch OFF state.

In an example illustrated in FIG. 8, the motor ECU 13 brings each of the outer arm elements 36 connected to the six primary conductors 55 into the switch ON state and each of the inner arm elements 37 connected thereto into the switch OFF state such that the current flows rightward in FIG. 8 (from the board 31 side toward the bus ring 57 side in reality) and that these six primary conductors 55, which are continuously aligned (circumferentially aligned in reality), constitute a single primary conductor group 55A. In addition, the motor ECU 13 brings each of the outer arm elements 36 connected to the six primary conductors 55 into the switch OFF state and each of the inner arm elements 37 connected thereto into the switch ON state such that the current flows leftward in FIG. 8 (from the bus ring 57 side toward the board 31 side in reality) and that these six primary conductors 55, which are continuously aligned (circumferentially aligned in reality), constitute a single primary conductor group 55B. In this way, six poles P are formed as illustrated in FIG. 8.

Meanwhile, in an example illustrated in FIG. 9, the motor ECU 13 brings each of the outer arm elements 36 connected to the four primary conductors 55 into the switch ON state and each of the inner arm elements 37 connected thereto into the switch OFF state such that the current flows rightward in FIG. 9 (from the board 31 side toward the bus ring 57 side in reality) and that these four primary conductors 55, which are continuously aligned (circumferentially aligned in reality), constitute the single primary conductor group 55A. In addition, the motor ECU 13 brings each of the outer arm elements 36 connected to the four primary conductors 55 into the switch OFF state and each of the inner arm elements 37 connected thereto into the switch ON state such that the current flows leftward in FIG. 9 (from the bus ring 57 side toward the board 31 side in reality) and that these four primary conductors 55, which are continuously aligned (circumferentially aligned in reality), constitute the single primary conductor group 55B. Furthermore, the motor ECU 13 brings the outer arm element 36 and inner arm element 37, each of which is connected to a primary conductor 55', into the switch OFF state such that the primary conductor 55', through which the current does not flow, is generated at intervals of eight conductors in the primary conductor group 55A and the primary conductor group 55B. In this way, the eight poles P are formed as illustrated in FIG. 9.

Just as described, the motor 40 in this embodiment is configured to change the number of the poles of the stator 50 when the motor ECU 13 changes a flow direction of the current through each of the 36 primary conductors 55 via the signal line terminal 38, so as to increase or reduce the number of the primary conductor groups 55A, 55B, in each of which the current flows in the same direction and the primary conductors 55 are continuously aligned in the circumferential direction. Hereinafter, this will also be referred to as "pole number change control".

The six poles and the eight poles are merely examples. Thus, by using the same inverter 30 and stator 50, it is also possible to produce the four poles by forming the primary conductor groups 55A, 55B, each of which includes the nine primary conductors 55, for example. Alternatively, for example, the 16 poles can be produced by forming the primary conductor groups 55A, 55B, each of which includes the 2 primary conductors 55, and generating the primary conductor 55', through which the current does not flow, at intervals of the 8 conductors. Further alternatively, the four poles or the six poles with three phases (a U-phase, a V-phase, and a W-phase) can be produced. In addition, since the inverter 30 in this embodiment has the same function as a normal inverter except that the number of the poles of the stator 50 can be changed, it is naturally possible to charge the battery 20 by converting regenerative power by the motor 40 to the direct current and supplying the direct current to the battery 20.

—Motor ECU—

Similar to the ECU 11 and the battery ECU 15, the motor ECU 13 is configured to include a so-called microcomputer having, for example, a CPU, ROM, RAM, backup RAM, an input/output interface, and the like. The CPU processes the signal according to the program that is stored in the ROM in advance while using the temporary storage function of the RAM, and thereby executes various types of control.

As described above, the motor ECU 13 is connected to the ECU 11 via the CAN communication line, and is configured to output, to the ECU 11, a signal on the temperature of the motor 40 received from the motor temperature sensor 43, a signal on the motor torque received from the torque sensor 45, and a signal on the rotation angle of the rotor 60 received from the rotation angle sensor 47. The motor ECU 13 is then configured to control the motor 40 on the basis of a command from the ECU 11.

Figure 10A:
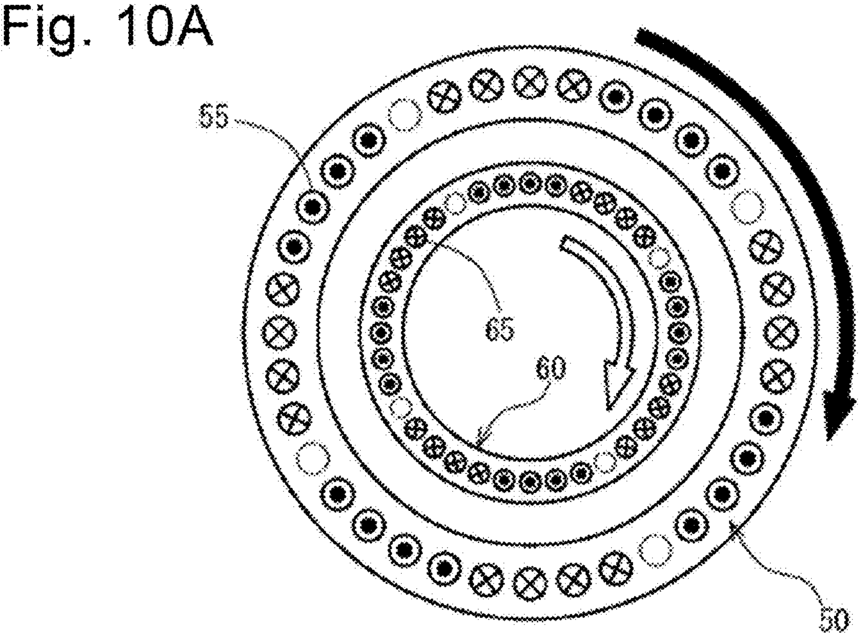
Figure 10B:
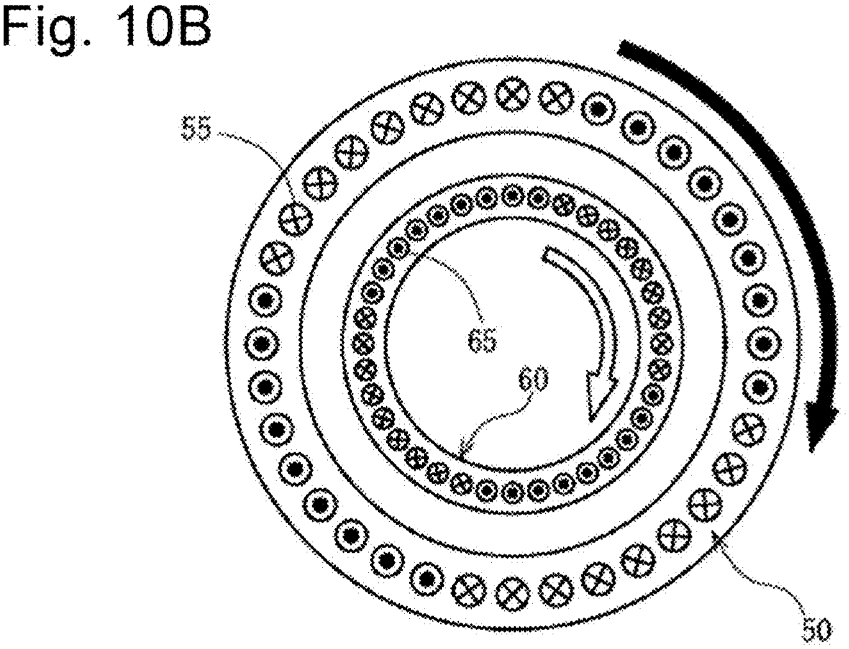

FIGS. 10A and 10B include views, each of which schematically illustrate a principle of rotation of the motor 40 in an asynchronous operation mode, and in which FIG. 10A illustrates the eighth-pole motor 40 in a low-speed range, and FIG. 10B illustrates the four-pole motor 40 in a high-speed range. In FIGS. 10A and 10B, an arrowhead symbol with an X inside a circle indicates that the current flows toward the back of the sheet (for example, from the board 31 side toward the bus ring 57 side), while an arrowhead symbol with a black dot in a circle indicates that the current flows toward the front of the sheet (for example, from the bus ring 57 side toward the board 31 side). Hereinafter, the principle of rotation of the motor 40 will be described without taking the effect of the permanent magnet 80 into consideration.

Since the motor rotation speed of the motor 40 is inversely proportional to the number of the poles of the stator 50, as illustrated in FIG. 10A, in the low-speed range, the motor ECU 13 sets the number of the poles to eight (a relatively large number), for example. Then, the motor ECU 13 supplies the current to the stator 50 (the primary conductor 55) via the signal line terminal 38 while causing high-speed switching of the outer arm element 36 and the inner arm element 37, so as to generate a clockwise rotating magnetic field as indicated by a black arrow in FIG. 10A. Consequently, the secondary conductor 65 moves relative to the rotating magnetic field, and thus the induced current flows through the secondary conductor 65 due to Fleming's right-hand rule. When the current flows through the secondary conductor 65 in the rotating magnetic field, just as described, an electromagnetic force is generated in the secondary conductor 65 due to Fleming's left-hand rule. In this way, as indicated by a blank arrow in FIG. 10A, asynchronous operation is performed in which the rotor 60 embedded with the secondary conductor 65 rotates clockwise at a low speed with a delay from rotation of the rotating magnetic field.

Meanwhile, as illustrated in FIG. 10B, in the high-speed range, the motor ECU 13 sets the number of the poles to four (a relatively small number), for example. Then, when the motor ECU 13 generates the clockwise rotating magnetic field as indicated by a black arrow in FIG. 10B, the electromagnetic force is generated in the secondary conductor 65. In this way, as indicated by a blank arrow in FIG. 10B, the asynchronous operation is performed in which the rotor 60 embedded with the secondary conductor 65 rotates clockwise at a high speed with the delay from the rotation of the rotating magnetic field.

In this way, in relation to the claims, the ECU 11, the motor ECU 13, and the inverter 30 in this embodiment correspond to the "control section (e.g., circuitry) capable of generating the rotating magnetic field in the stator through the current supply to the primary conductor and setting a drive mode of the motor in the asynchronous operation mode in which the rotor is rotated by using the induced current generated in the secondary conductor". Hereinafter, the ECU 11, the motor ECU 13, and the inverter 30 will also be referred to as the "ECU 11 and the like".

(Mode Switching Control)

In the vehicle drive system 10 according to this embodiment, as described above, the rotor 60 has not only the permanent magnet 80 but also the secondary conductor 65. Thus, the motor 40 can be rotationally driven in two different modes that are: a synchronous operation mode in which the rotor 60 is rotated by using a magnetic force of the permanent magnet 80; and the asynchronous operation mode in which the rotor 60 is rotated by using the induced current generated in the secondary conductor 65.

More specifically, the ECU 11, and the like are configured to control the rotating magnetic field by causing a flow of an input current of a predetermined phase, a predetermined advance angle, and a predetermined magnitude through the primary conductor 55 on the basis of the rotation angle of the rotor 60 detected by the rotation angle sensor 47, and the like. In this way, the ECU 11 and the like are configured to execute mode switching control to switch between the synchronous operation mode and the asynchronous operation mode. Hereinafter, a description will be made on the synchronous operation mode and the asynchronous operation mode that are executed by the ECU 11 and the like.

—Synchronous Operation Mode—

In the synchronous operation mode, an angular velocity of the rotating magnetic field is synchronized with (made to match) a mechanical rotational speed of the rotor 60 through control of the rotating magnetic field by the ECU 11 and the like. In addition, in the synchronous operation mode, the DC power that is supplied from the battery 20 is converted to AC power during rotation of the rotor 60. Meanwhile, when the rotor 60 is stationary, the AC power is converted to the DC power. In the synchronous operation mode, steady torque is generated by the rotating magnetic field and the permanent magnet 80. As described above, the induced current is generated when the secondary conductor 65 moves relative to the rotating magnetic field (crosses the magnetic field). However, in the synchronous operation mode, in which the angular velocity of the rotating magnetic field matches the mechanical rotational speed of the rotor 60, the induced current does not flow through the secondary conductor 65. That is, in the synchronous operation mode, the secondary conductor 65 does not affect output torque of the motor 40.

—Asynchronous Operation Mode—

In the asynchronous operation mode, through the control of the rotating magnetic field by the ECU 11 and the like, a speed difference is generated between the angular velocity of the rotating magnetic field and the mechanical rotational speed of the rotor 60, so as to prevent matching (cause mismatching) therebetween. In addition, in the asynchronous operation mode, the DC power that is supplied from the battery 20 is converted to the AC power when the rotor 60 is rotated and is stationary. In the asynchronous operation mode, the steady torque is generated by the rotating magnetic field and the induced current generated in the secondary conductor 65. In the asynchronous operation mode, even in the case where the number of the poles of the stator 50 matches the number of the poles of the permanent magnets 80, the angular velocity of the rotating magnetic field is always excessively higher or lower than the mechanical rotational speed of the rotor 60, and thus the permanent magnets 80 cause positive/negative torque fluctuations. Then, due to an effect of the torque fluctuation, the steady torque, which is generated by the rotating magnetic field and the secondary conductor 65, fluctuates. That is, in the asynchronous operation mode, the permanent magnet 80 affects the output torque of the motor 40.

—How to Use Both Modes—

An advantage of the synchronous operation mode using the permanent magnet 80 is that the motor 40 can be actuated instantaneously at the maximum torque even in the low-speed range. However, in the high-speed range, since a large back electromotive force is generated due to the effect of the permanent magnet 80, there is a disadvantage of reduced output. Thus, in the vehicle drive system 10 according to this embodiment, the ECU 11 and the like are configured to actively use the synchronous operation mode in the low-speed range while using the asynchronous operation mode in other ranges particularly including the high-speed range.

As described above, the characteristic of the motor 40 can be changed by switching the drive mode of the motor 40 between the synchronous operation mode and the asynchronous operation mode. In this way, it is possible to generate a wide range of the required output according to the driver's preference.

(Pulsation Generation Control)

By the way, in the engine vehicle, engine vibration that is transmitted to the cabin is changed according to a difference in an engine operation state. Thus, many drivers recognize the engine operation state from such vibration transmitted to the cabin. Meanwhile, since it is difficult for the driver to recognize vibration of the motor 40 in the electric vehicle 1, such a case is assumed that, when the driver who is accustomed to driving the engine vehicle drives the electric vehicle 1, the driver may feel a sense of discomfort due to a reason that the driver cannot recognize the operation state from the vibration transmitted to the cabin.

Here, for example, it is considered to separately install a mechanism that generates pseudo-vibration in response to a change in an operation state of the motor 40. However, installment of such a mechanism that does not contribute to the vehicle travel in any way complicates a vehicle structure, increases weight of a vehicle body, and increases manufacturing cost.

In view of the above, in this embodiment, when the motor 40 is rotationally driven, such a state is created where pulsation can be generated easily. More specifically, in the vehicle drive system 10 according to this embodiment, the ECU 11 and the like are configured to execute pulsation generation control for generating pulsation in the motor 40 by making the number of the poles of the stator 50 different from that of the permanent magnets 80 in the asynchronous operation mode.

Figure 11:
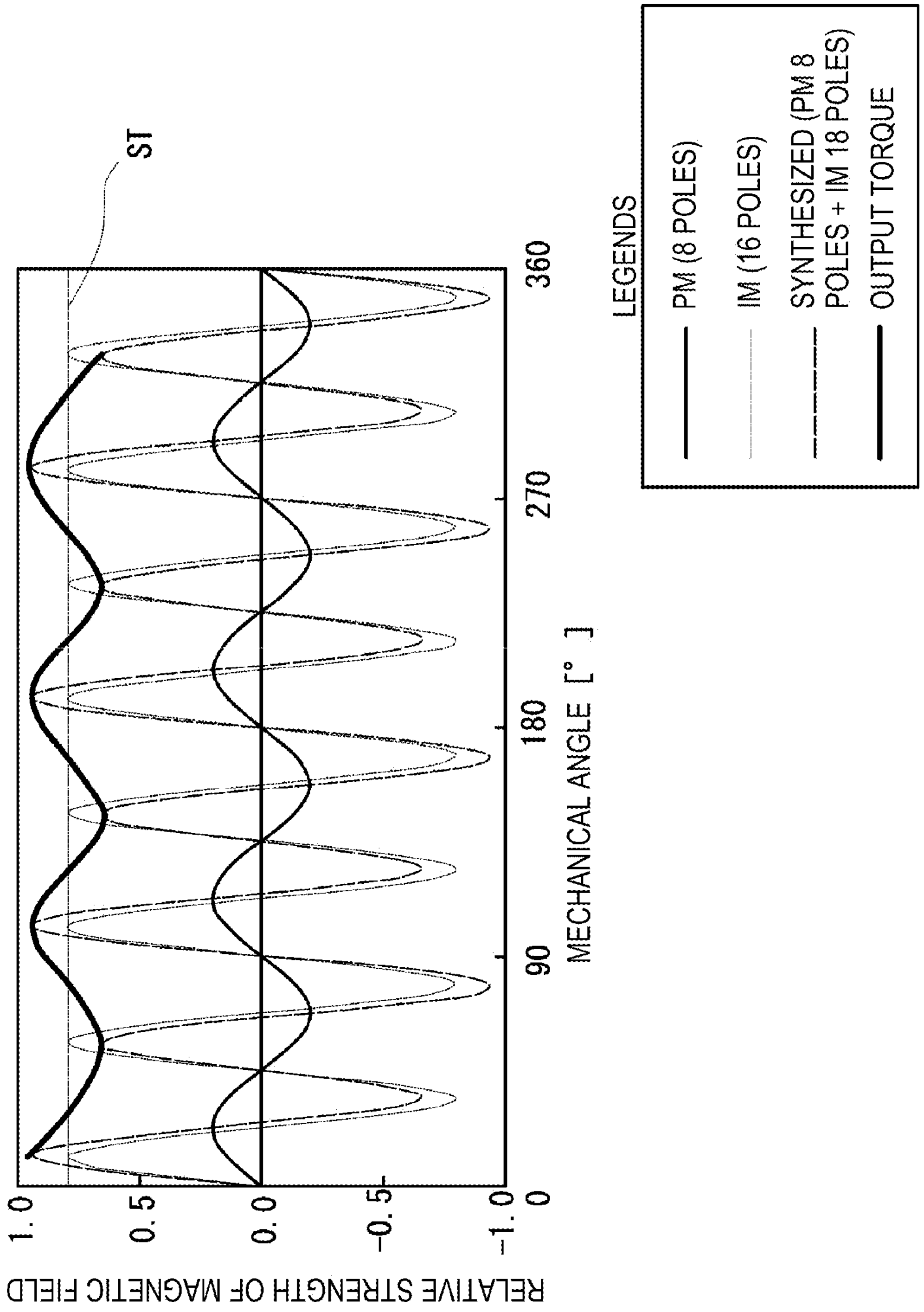
FIG. 11 is a graph schematically illustrating motor output torque in a case where the number of poles of the stator differs from number of poles of the permanent magnet in an asynchronous operation mode.

FIG. 11 is a graph schematically illustrating the output torque of the motor 40 in the case where the number of the poles of the stator 50 differs from the number of the poles of the permanent magnets 80 in the asynchronous operation mode. By executing the pole number change control in the asynchronous operation mode, even in the case where the stator 50 has the 16 poles that differ from the number of the poles (the 8 poles) of the permanent magnets 80, as illustrated in FIG. 11, steady torque ST is generated by the rotating magnetic field and the induced current generated in the secondary conductor 65 when the effect of the permanent magnets 80 is ignored.

Here, a period of the magnetic field created by the 16-pole IM motor (asynchronous motor) differs from a period of the magnetic field created by the PM motor (the synchronous motor) using the 8-pole permanent magnets 80. In other words, there is a period difference between these magnetic fields. Thus, as it is understood from a comparison between a dotted line (IM) and a thin solid line (PM) in FIG. 11, there is a phase difference therebetween. Thus, the output torque, which is generated by the magnetic field combining those two magnetic fields (see a broken line in FIG. 11), is not the steady torque and fluctuates (pulsates) as indicated by a bold solid line in FIG. 11.

That is, as described above, in the asynchronous operation mode, even in the case where the number of the poles of the stator 50 matches the number of the poles of the permanent magnets 80, the pulsation is generated due to the positive and negative torque fluctuations by the permanent magnets 80. However, by executing the pulsation generation control as described above, it is possible to reliably generate the larger pulsation in the motor 40 due to a combination of the torque fluctuations by the permanent magnets 80 and the phase difference caused by the mismatch between the number of the poles of the stator 50 and the number of the poles of the permanent magnets 80.

As described above, in the vehicle drive system 10 according to this embodiment, the pulsation is generated in the asynchronous operation mode by making the number of the poles of the stator 50 different from that of the permanent magnets 80. Thus, the driver can recognize the operation state of the motor 40 from the vibration of the motor 40 transmitted to the cabin. In this way, it is possible to suppress the driver from feeling the sense of discomfort without separately installing the mechanism that generates the pseudo-vibration.

By the way, in the engine vehicle, the engine operation state is changed prominently during rapid acceleration, during rapid deceleration, at a start on an uphill road, and the like. Thus, in regard to the point of suppressing the driver from feeling the sense of discomfort, it can be said that it is effective to generate the pulsation in the electric vehicle 1 in those situations as well.

For this reason, in the vehicle drive system 10 according to this embodiment, the ECU 11 and the like are configured to change the number of the poles of the stator 50 on the basis of at least one of a driving operation by the driver and the surrounding travel environment of the own vehicle such that the pulsation of the motor 40 is changed according to at least one of these driving operation and surrounding travel environment.

Here, the "driving operation by the driver" includes an accelerator operation and a brake operation. The ECU 11 is configured to recognize occurrence of a situation where the required torque for the motor 40 is increased by using a control map (a first control map) which is stored in the ROM in advance and in which the required torque for the motor 40 defined by the accelerator pedal depression amount (and the brake pedal depression amount) and the vehicle speed V is mapped.

More specifically, the ECU 11 is configured to make the number of the poles of the stator 50 different from the number of the poles of the permanent magnets 80 in the case where required drive power (the required torque) is large. The required drive power (the required torque) is estimated by using the first control map on the basis of the vehicle speed V detected by the vehicle speed sensor 74 and the accelerator depression amount (the accelerator operation) detected by the accelerator pedal sensor 70. For example, when the accelerator pedal is heavily depressed during the travel, the ECU 11 and the like make the number of the poles of the stator 50 different from the number of the poles of the permanent magnets 80. Accordingly, the pulsation of the motor 40 is changed before and after such an accelerator operation. As a result, the driver can recognize the acceleration desired by the driver himself/herself with the vibration of the motor 40 transmitted to the cabin, for example.

The ECU 11 is also configured to make the number of the poles of the stator 50 different from the number of the poles of the permanent magnets 80 in the case where a required braking force, which is estimated on the basis of the vehicle speed V and the brake pedal depression amount (the brake operation) detected by the brake pedal sensor 71, is large. For example, when the brake pedal is depressed during high-speed travel, the ECU 11 and the like make the number of the poles of the stator 50 different from the number of the poles of the permanent magnet 80. Accordingly, the pulsation of the motor 40 is changed before and after such a brake operation. As a result, the driver can recognize the deceleration desired by the driver himself/herself with the vibration of the motor 40 transmitted to the cabin, for example.

Furthermore, as described above, the ECU 11 acquires the surrounding travel environment of the electric vehicle 1 (the flat road, the uphill road, the downhill road, turning, the winding road, or the urban area) on the basis of the location information received from the GPS receiver 75 and the map database stored in the ROM. The ECU 11 is then configured to recognize the occurrence of the situation where the required torque for the motor 40 is increased by using a control map (a second control map) which is stored in the ROM in advance and in which the required torque for the motor 40 defined by the vehicle speed V and the surrounding travel environment is mapped.

More specifically, when the electric vehicle 1 is traveling on the uphill road, the ECU 11 and the like make the number of the poles of the stator 50 different from the number of the poles of the permanent magnets 80. Accordingly, the pulsation of the motor 40 is changed before and after a change in the surrounding travel environment. As a result, the driver can recognize the increased motor torque due to the uphill road, or the like with the vibration of the motor 40 transmitted to the cabin.

Here, the motor torque is increased in proportion to the number of the poles of the stator 50. Thus, in the situation where the required torque for the motor 40 is increased, the ECU 11 and the like may be configured to increase the number of the poles of the stator 50 within an allowable range instead of only making the number of the poles of the stator 50 different from the number of the poles of the permanent magnets 80.

As described above, in this embodiment, by intentionally creating the primary conductor 55', through which the current does not flow, the gap is generated between the magnetic fields, and a pitch of the poles P becomes unequal. Thus, the pulsation can be generated. Accordingly, in the case where the primary conductor 55' is created intentionally, the pulsation by the primary conductor 55' and the pulsation by the pulsation generation control are combined. As a result, the driver can further reliably recognize the operation state of the motor 40 from the vibration of the motor 40 transmitted to the cabin.

(Control Flow)

Figure 12:
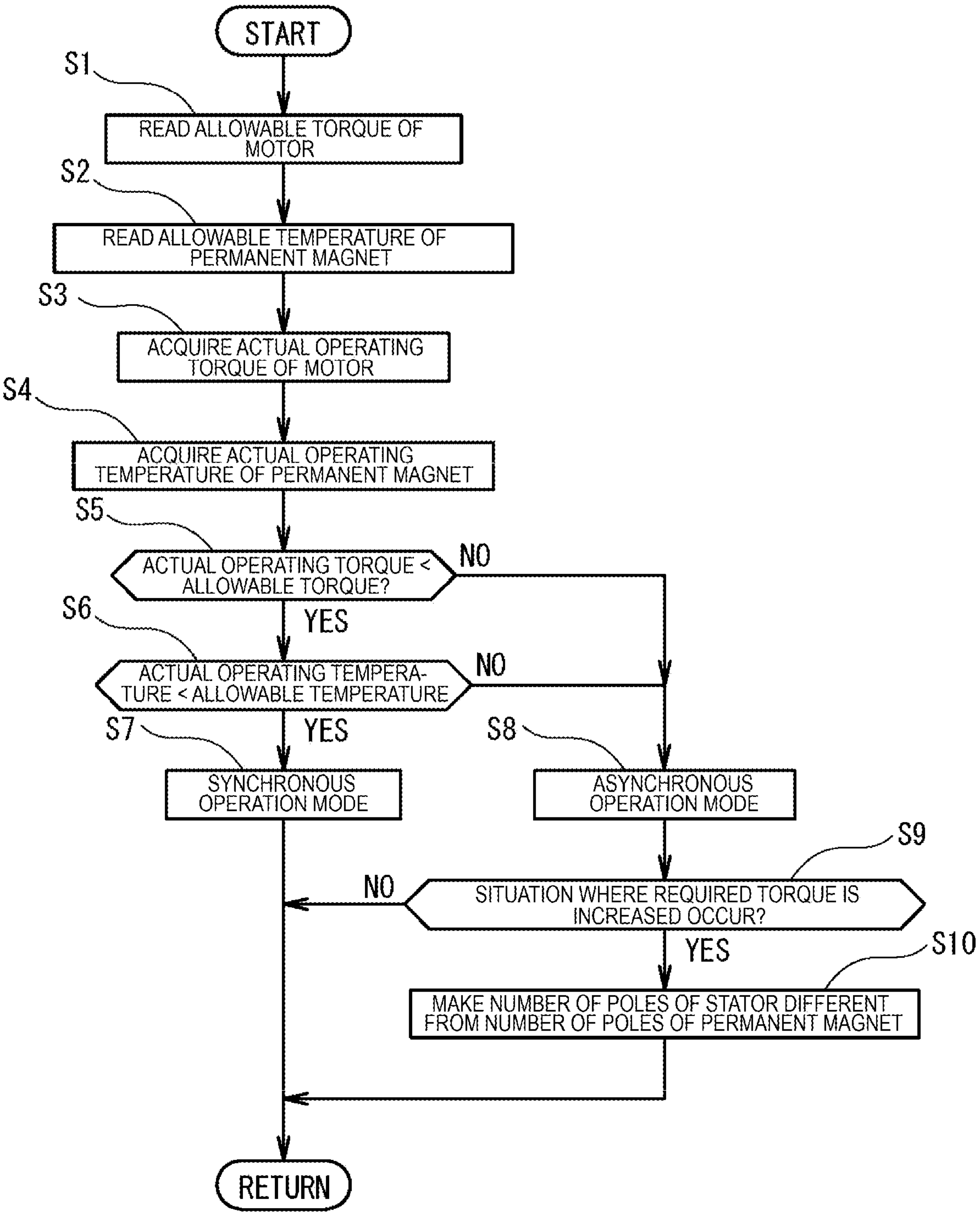
FIG. 12 is a flowchart illustrating an example of control that is executed by a control section.

Next, a description will be made on examples of the mode switching control and the pulsation generation control, which are executed by the ECU 11 and the like, with reference to a flowchart illustrated in FIG. 12. In this flowchart, it is assumed that the number of the poles of the stator 50 and the number of the poles of the permanent magnets 80 match each other as the eight poles at START.

First, in step S1, the ECU 11 reads allowable torque of the motor 40, which is stored in the ROM. Then, the processing proceeds to step S2. In next step S2, the ECU 11 reads an allowable temperature of the permanent magnet 80, which is stored in the ROM. Then, the processing proceeds to step S3.

In next step S3, the ECU 11 and the like acquire the motor torque (actual operating torque of the motor 40) detected by the torque sensor 45. Then, the processing proceeds to step S4. In next step S4, the ECU 11 and the like acquire a temperature (an actual operating temperature) of the permanent magnet 80 detected by the motor temperature sensor 43. Then, the processing proceeds to step S5.

In next step S5, the ECU 11 determines whether the actual operating torque of the motor 40, which is acquired in step S3, is smaller than the allowable torque, which is read in step S1. If it is determined NO in this step S5, the processing proceeds to step S8. On the other hand, if it is determined YES in this step S5, the processing proceeds to step S6. In next step S6, the ECU 11 determines whether the actual operating temperature of the permanent magnet 80, which is acquired in step S4, is lower than the allowable temperature of the permanent magnet 80, which is read in step S2. If it is determined NO in this step S6, the processing proceeds to step S8. On the other hand, if it is determined YES in this step S6, the processing proceeds to step S7. That is, if the actual operating torque is smaller than the allowable torque and the actual operating temperature is lower than the allowable temperature, the processing proceeds to step S7. Otherwise, the processing proceeds to step S8.

In step S7, the ECU 11 and the like set the operation mode of the motor 40 to the synchronous operation mode, and then the processing returns. Meanwhile, in step S8, the ECU 11 and the like set the operation mode of the motor 40 to the asynchronous operation mode, and then the processing proceeds to step S9.

In step S9, the ECU 11 determines whether such a situation occurs where the required torque is increased on the basis of the accelerator operation or the brake operation by the driver or on the basis of the surrounding travel environment of the electric vehicle 1. If it is determined NO in this step S9, the processing returns as is. On the other hand, if it is determined YES in this step S9, the processing proceeds to step S10, and the ECU 11 and the like make the number of the poles of the stator 50 different from the number of the poles of the permanent magnet 80. Then, the processing returns.

OTHER EMBODIMENTS

The disclosure is not limited to the embodiment and can be carried out in various modes without departing from the spirit and main features thereof.

In the above embodiment, the ECU 11 and the like can change the number of the poles of the stator 50. However, the disclosure is not limited thereto. For example, the number of the poles P of the stator 50 may be fixed to a different number of the poles from the number of the poles of the permanent magnets 80.

In the above embodiment, the eight permanent magnets 80 are embedded in the rotor core 61. However, the disclosure is not limited thereto. The 6 or less or 10 or more permanent magnets 80 may be embedded in the rotor core 61.

In the above embodiment, the motor 40 is arranged in a front portion of the electric vehicle 1 in the vehicle front-rear direction, and the front wheels 7 are the drive wheels. However, the disclosure is not limited thereto. For example, the motor 40 may be arranged in a rear portion of the electric vehicle 1 in the vehicle front-rear direction, and the rear wheels 8 may be the drive wheels.

As described above, the above-described embodiment is merely illustrative in all respect and thus should not be construed in a restrictive manner. Furthermore, modifications and changes that fall within equivalents of the claims fall within the scope of the disclosure.

INDUSTRIAL APPLICABILITY

According to the disclosure, the driver can recognize the operation state from the motor vibration in a simple configuration. Thus, the disclosure is extremely beneficial when being applied to the vehicle drive system that includes the motor as the traveling drive source.

DESCRIPTION OF REFERENCE SIGNS AND NUMERALS

1: VEHICLE
7: FRONT WHEEL (DRIVE WHEEL)
10: VEHICLE DRIVE SYSTEM
11: ECU (CONTROL SECTION)
13: MOTOR ECU (CONTROL SECTION)
30: INVERTER (CONTROL SECTION)
40: MOTOR
50: STATOR
55: PRIMARY CONDUCTOR
55A: PRIMARY CONDUCTOR GROUP
55B: PRIMARY CONDUCTOR GROUP
60: ROTOR
61*c*: OUTER CYLINDRICAL SECTION (RADIALLY OUTER PORTION)
65: SECONDARY CONDUCTOR
80: PERMANENT MAGNET
P: POLE

The invention claimed is:

1. A vehicle drive system comprising:

a motor that has a cylindrical stator and a cylindrical rotor rotatably provided in the stator to be coaxial with a center axis of the stator and that drives a drive wheel of a vehicle by rotation of the rotor, the stator having primary conductors that extend in an axial direction and are aligned in a circumferential direction, the rotor having: secondary conductors that extend in the axial direction and are aligned in the circumferential direction in a radially outer portion; and permanent magnets that extend in the axial direction and are aligned in the circumferential direction in a portion on a radially inner side of the secondary conductors, circuitry configured to generate a rotating magnetic field in the stator through a current supply to the primary conductor and set a drive mode of the motor to an asynchronous operation mode in which the rotor is rotated by using an induced current generated in the secondary conductor, wherein in the asynchronous operation mode, a number of poles of the stator is different from a number of poles of the permanent magnets, and the circuitry is configured to determine whether a surrounding travel environment of the vehicle satisfies a predetermined condition, and after it is determined that the predetermined condition is satisfied, intentionally switch the motor to the asynchronous operation mode to generate a controlled torque pulsation as a functional output.

2. The vehicle drive system according to claim 1, wherein the circuitry is configured to change the number of the poles of the stator by changing a direction of a current flowing through each of the primary conductors and increasing/reducing a number of primary conductor groups, in each of which the current flows in a same direction and the primary conductors are continuously aligned in the circumferential direction, based on a driving operation by a driver such that the torque pulsation of the motor is changed according to the driving operation.

3. The vehicle drive system according to claim 1, wherein the circuitry is configured to change the number of the poles of the stator by changing a direction of a current flowing through each of the primary conductors and increasing/reducing a number of primary conductor groups, in each of which the current flows in a same direction and the primary conductors are continuously aligned in the circumferential direction, based on a surrounding travel environment of the vehicle such that the torque pulsation of the motor is changed according to the surrounding travel environment.

4. The vehicle drive system according to claim 1, wherein the circuitry is configured to change the number of the poles of the stator by changing a direction of a current flowing through each of the primary conductors.

5. The vehicle drive system according to claim 1, wherein the circuitry is configured to change the number of the poles of the stator by changing a direction of a current flowing through each of the primary conductors and increasing/reducing a number of primary conductor groups.

* * * * *